United States Patent
Fly

(10) Patent No.: US 7,399,545 B2
(45) Date of Patent: Jul. 15, 2008

(54) SUPERSONIC VAPOR COMPRESSION AND HEAT REJECTION CYCLE

(75) Inventor: Gerald A Fly, Geneseo, NY (US)

(73) Assignee: General Motors Corporation, Detroit, MI (US)

( * ) Notice: Subject to any disclaimer, the term of this patent is extended or adjusted under 35 U.S.C. 154(b) by 517 days.

(21) Appl. No.: 10/960,123

(22) Filed: Oct. 7, 2004

(65) Prior Publication Data

US 2005/0048339 A1 Mar. 3, 2005

Related U.S. Application Data

(62) Division of application No. 10/191,201, filed on Jul. 9, 2002, now Pat. No. 6,835,484.

(51) Int. Cl.
*H01M 8/04* (2006.01)
*F28F 7/00* (2006.01)

(52) U.S. Cl. .............................. 429/26; 429/34; 429/25; 165/138

(58) Field of Classification Search ................... 429/26, 429/25, 34, 38, 39, 12, 120; 417/77, 87, 417/151, 158, 88, 196, 54, 53, 57, 198, 178; 62/50; 165/138
See application file for complete search history.

(56) References Cited

U.S. PATENT DOCUMENTS

| | | | |
|---|---|---|---|
| 4,569,635 A * | 2/1986 | Nicodemus | ................. 417/196 |
| 4,670,357 A | 6/1987 | Taylor | |
| 4,809,523 A | 3/1989 | Vandenberg | |
| 4,923,768 A | 5/1990 | Kaneko et al. | |
| 5,647,221 A | 7/1997 | Garris, Jr. | |
| 5,776,624 A | 7/1998 | Neutzler | |
| 2001/0003275 A1 | 6/2001 | Hua | |
| 2003/0039872 A1* | 2/2003 | Grasso et al. | ................. 429/24 |

OTHER PUBLICATIONS

International Search Report for International Application No. PCT/US0321191, Filed Jul. 7, 2003.

* cited by examiner

*Primary Examiner*—Raymond Alejandro

(57) ABSTRACT

Method and apparatus for cooling a fuel cell stack. The cooling system uses vaporization cooling of the fuel stack and supersonic vapor compression of the vaporized coolant to significantly increase the temperature and pressure of the liquid coolant flowing through a heat exchanger. By increasing the heat rejection temperature of the coolant delivered to the heat exchanger, the heat transfer area of the heat exchanger can be reduced and the mass flow rate of coolant can also be reduced. The increased fluid pressure is used to circulate the coolant through the cooling system, thereby eliminating the circulation pump associated with conventional systems.

12 Claims, 9 Drawing Sheets

SUPERSONIC VAPOR COMPRESSION AND HEAT REJECTION CYCLE

CROSS-REFERENCE TO RELATED APPLICATIONS

This application is a divisional of U.S. patent application Ser. No. 10/191,201, filed Jul. 9, 2002, now U.S. Pat. No. 6,835,484, which issued on Dec. 28, 2004, The disclosure of the above application is incorporated herein by reference.

FIELD OF THE INVENTION

The present invention relates generally to a method and apparatus for transferring heat, and more specifically, for cooling a fuel cell stack.

BACKGROUND OF THE INVENTION

Cooling systems are implemented in a variety of applications for cooling a heat source. Generally, cooling systems include a cooling fluid flowing therethrough, which undergoes phase changes to perform the cooling function. In particular, the cooling fluid cools the heat source via a heat transfer therefrom, whereby the cooling fluid is caused to vaporize from an original liquid form. The coolant fluid, in vapor form flows through a heat exchanger which is in heat exchange communication with a lower temperature source, such as ambient air. As the vapor flows through the heat exchanger heat exchange occurs from the vapor, thereby partially transforming the coolant fluid to its liquid phase. A condenser is also included for condensing the remaining vapor phase to the liquid phase. A large circulation pump is required for circulating the liquid coolant through the heat source and the components of the cooling system.

One such application that requires a cooling system is a fuel cell system. Fuel cells have been used as a power source in many applications, such as electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive, solid polymer electrolyte membrane having the anode catalyst on one face and the cathode catalyst on the opposite face. The MEA is sandwiched between a pair of electrically conductive elements which (1) serve as current collectors for the anode and cathode, and (2) contain appropriate channels and/or openings formed therein for distributing the fuel cell's gaseous reactants over the surfaces of the respective anode and cathode catalysts.

The term "fuel cell" is typically used to refer to either a single cell or a plurality of cells (stack) depending on the context. A plurality of individual cells are typically bundled together to form a fuel cell stack and are commonly arranged electrically in series. Each cell within the stack includes the membrane electrode assembly (MEA) described earlier, and each such MEA provides its increment of voltage. A group of adjacent cells within the stack is referred to as a cluster. By way of example, some typical arrangements for multiple cells in a stack are shown and described in U.S. Pat. No. 5,763,113.

In PEM fuel cells, hydrogen ($H_2$) is the anode reactant (i.e., fuel) and oxygen is the cathode reactant (i.e., oxidant). The oxygen can be either a pure form ($O_2$) or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. As such these MEAs are relatively expensive to manufacture and require certain conditions, including proper water management and humidification and control of catalyst fouling constituents such as carbon monoxide (CO), for effective operation.

The electrically conductive elements sandwiching the MEAs may contain an array of grooves in the faces thereof for distributing the fuel cell's gaseous reactants (i.e., hydrogen and oxygen in the form of air) over the surfaces of the respective cathode and anode. In the fuel cell stack, a plurality of cells are stacked together in electrical series while being separated by a gas impermeable, electrically conductive, bipolar plate. The bipolar plate serves several functions including: (a) acting as an electrically conductive gas separator element between two adjacent cells; (2) distributing reactant gases across substantially the entire surface of the membrane; (3) conducting electrical current between the anode of one cell and the cathode of the next adjacent cell in the stack; (4) keeping the reactant gases separated in order to prevent auto ignition; (5) providing a support structure for the proton exchange membrane; and (6) in most cases, providing internal cooling passages defined by internal heat exchange faces and through which a coolant flow to remove waste heat from the stack. Various examples of a bipolar plate for use in PEM fuel cells are shown and described in commonly-owned U.S. Pat. No. 5,776,624.

Current fuel cell cooling systems are undesirably large, including the large circulation pump for circulating the liquid coolant through the fuel cell stack (i.e. heat source) to the heat exchanger where the waste thermal energy (i.e., heat) is transferred to the environment. The thermal properties of typical liquid coolants require a large volume to be circulated through the system to reject sufficient waste heat to maintain the stack operating temperature, particularly under maximum power conditions. For example, a PEM fuel cell stack operating at 80 KW and 50% efficiency with an operating temperature of 80° C. will generate 80 KW of waste heat that must be rejected. However, since a maximum ambient air temperature of about 40° C. can be utilized for heat rejection, a mass flow rate of approximately 2000-3000 grams/sec. of coolant must flow through the stack in combination with use of large heat exchanger areas to accommodate the required heat rejection. As is well known, the expense associated with large heat exchangers and the other cooling system components (recirculation pump, proportional mixing valves, PID controllers, etc.), combined with packaging constraints caused by physical size requirements of the components, have had a detrimental impact on widespread commercialization of fuel cell systems. Thus, a need exists to develop alternative fuel cell cooling systems which overcome the shortcomings of conventional cooling systems and assist in advancing the art.

SUMMARY OF THE INVENTION

The present invention relates to a method and apparatus for extracting waste heat from a heat source, such as a fuel cell stack, and rejecting the waste heat to the environment through a heat exchanger.

In one aspect, the method of the present invention extracts waste heat from a heat source, such as a fuel cell stack, by circulating a heat transfer fluid in a flow path between the fuel cell stack and the heat exchanger, and transferring heat from the fuel cell stack to the fluid by causing a portion of the fluid to vaporize. The energy required to vaporize the liquid coolant is significantly greater than the heat carrying capacity of the liquid.

In another aspect of the method of the present invention, the waste heat is rejected through the heat exchanger by separating the coolant discharged from the fuel cell stack into a vapor stream and a liquid stream, accelerating the vapor stream to supersonic speed, contacting the high velocity vapor stream with a portion of the liquid stream, and transferring the vapor stream momentum to the liquid. The resulting high temperature, high pressure liquid stream is delivered to the heat exchanger for heat rejection to the environment.

The apparatus of the present invention comprises a vapor separator for separating the coolant exiting the fuel cell stack into a liquid stream and a vapor stream, and a supersonic nozzle/ejector unit having a vapor inlet receiving the vapor stream and a liquid inlet receiving the liquid stream. The nozzle/ejector unit is operable to accelerate the vapor stream to supersonic velocity. The supersonic vapor stream accelerates the liquid stream as both travel toward the outlet of the nozzle/ejector unit. The high velocity vapor/liquid mixture enters the outlet of the nozzle/ejector unit which condenses the vapor and causes an increase in the coolant pressure and temperature. The high temperature, high pressure coolant is then delivered to the first heat exchanger where the fluid temperature is reduced to the operating temperature of the fuel cell stack. The fluid is then circulated to the inlet of the fuel cell stack. As such, the nozzle/ejector unit generates sufficient fluid pressure to drive circulation of the coolant through the entire system and further increases the heat rejection temperature of the fluid delivered to the heat exchanger for permitting reductions in the heat exchanger surface area and the mass flow rate of the coolant.

In accordance with one aspect of the present invention, the liquid stream from the vapor separator is returned to the inlet of the fuel cell stack and the liquid stream delivered to the liquid inlet of the nozzle/ejector unit is routed from a portion of the coolant flow downstream of the heat exchanger. As a related aspect, a second heat exchanger is disposed between the first heat exchanger and the liquid inlet of the nozzle/ejector unit for cooling the liquid stream prior to delivery to the nozzle/ejector unit. This arrangement is operable to establish a desired temperature difference between the vapor stream and the liquid stream delivered to the inlet side of the nozzle/ejector unit.

The present invention utilizes vapor cooling of a heat source, such as the fuel cell stack, to provide improved control over the stack operating temperature. In addition, the enthalpy of the vapor is used to raise the heat rejection temperature of the coolant delivered to the primary heat exchanger and its fluid pressure is used to circulate the coolant. This permits elimination of the large circulation pump used in conventional cooling systems which significantly improves the overall efficiency of the fuel cell system. The invention is also adaptable for use in a variety of systems where heat transfer occurs, and it is desired to decrease pumping power and increase the temperature at which heat is rejected.

BRIEF DESCRIPTION OF THE DRAWINGS

The various features, advantages and other uses of the present invention will become more apparent by referring to the following description and drawings in which.

DETAILED DESCRIPTION OF THE PREFERRED EMBODIMENTS

Figure 1:
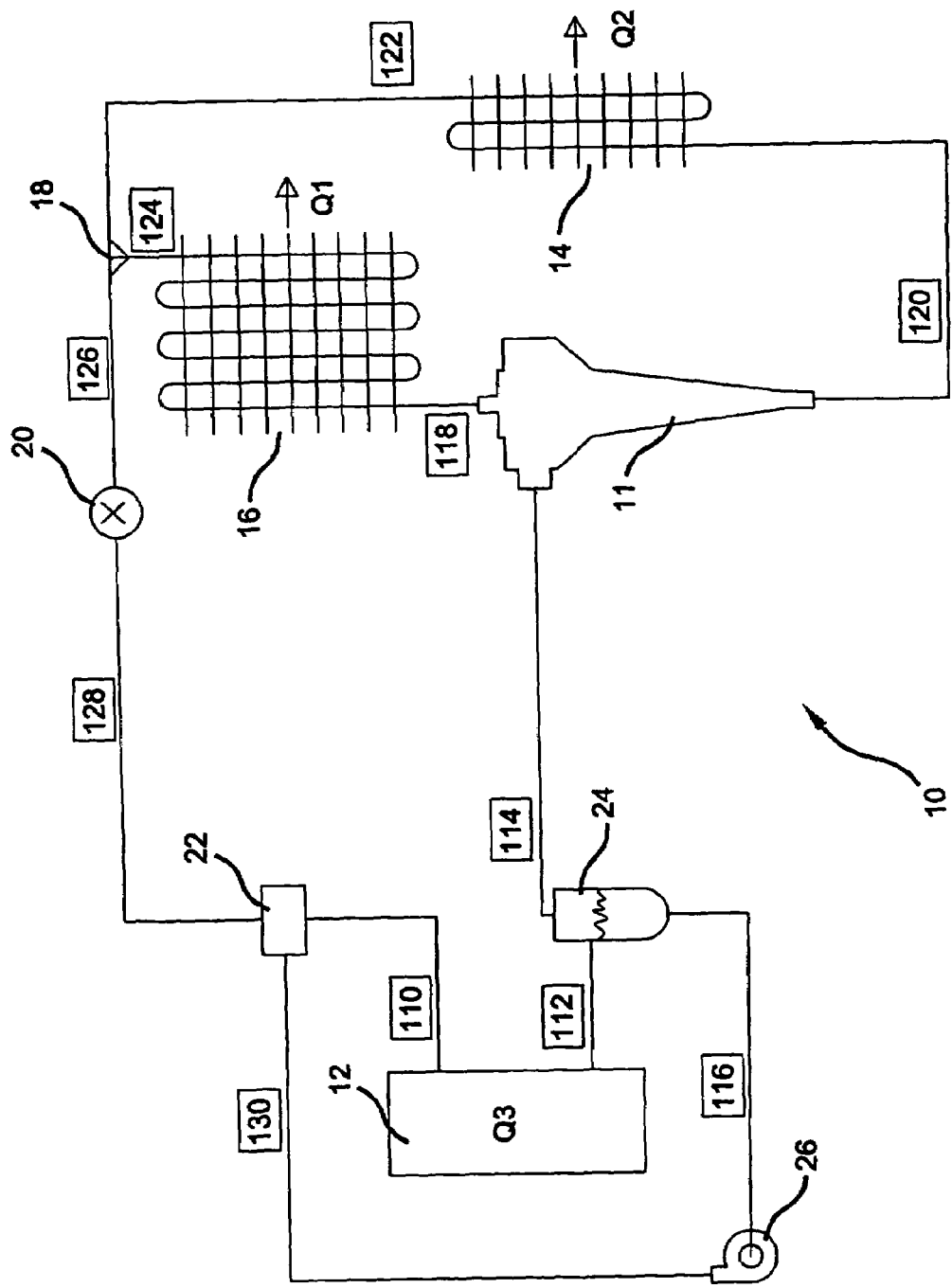
FIG. 1 is a schematic diagram of a cooling system according to the principles of the present invention.

Referring now to FIG. 1, a cooling system 10 is provided for cooling a heat source 12. The cooling system 10 includes a supersonic nozzle/ejector unit 11, a primary heat exchanger 14, a secondary heat exchanger 16, a splitter valve 18, a pressure regulator valve 20, a mixer 22, a vapor separator 24 and a pump 26. The various components of the cooling system 10 are configured in a circuit for providing fluid communication therebetween. In particular, cooling fluid circulating through the cooling system 10 is in heat exchange relationship with the heat source 12 for cooling the heat source 12. As described in further detail herein, the cooling fluid, having cooled the heat source 12, is heated to a partial vapor, liquid state. The vapor separator 24 separates the vapor fraction from the liquid fraction as the coolant exits the heat source 12. The liquid fraction is pumped by the pump 26 back around to the mixer 22 for further cooling of the heat source 12. The vapor fraction is directed to the nozzle/ejector unit 11.

The nozzle/ejector unit 11 utilizes the vapor fraction discharged from the heat source 12 to increase the temperature and pressure of coolant fluid supplied to the primary heat exchanger 14, as described in further detail herein. The higher temperature and pressure coolant fluid discharged from the nozzle/ejector unit 11 flows through the primary heat exchanger 14 where heat transfer to ambient occurs, thereby reducing the temperature and pressure of the coolant fluid. The splitter valve 18 splits the stream exiting the primary heat exchanger 14 into a first liquid stream supplied to the secondary heat exchanger 16 and a second liquid stream routed toward the heat source 12. The splitter valve 18 also reduces the pressure of the second liquid stream. The secondary heat exchanger 16 functions to reduce the temperature of the liquid coolant delivered to the liquid inlet of the nozzle/ejector unit 11 to a value below the vaporization temperature of the coolant.

The pressure regulator valve 20 functions to reduce the pressure of the high pressure liquid coolant discharged from the mixer 22 to the heat source inlet pressure for mixing with the liquid fraction in the mixer 22. The mixer 22 combines the liquid coolant flowing from the primary heat exchanger 14 with the liquid coolant from the vapor separator 24. The small low-power return pump 26 delivers the coolant recycled from vapor separator 24 to the mixer 22. The outlet of the mixer 22 is delivered to the heat source 12. The pump 26 can also be used during start-up of the cooling system 10.

In its most basic form, the cooling system 10 incorporates the use of vaporization cooling of the heat source 12 and supersonic vapor compression of the vaporized coolant to provide significant advantages over conventional liquid coolant systems. In particular, the energy required to vaporize a liquid coolant as it flows through the cooling plates of a high temperature heat source is much greater than the heat carrying capacity of the liquid coolant. As a result, the mass flow rate of coolant required for stack cooling and which is circulated through cooling system is significantly reduced. With regard to supersonic vapor compression, the enthalpy of the vapor discharged from the heat source 12 is utilized to increase the temperature and pressure of the coolant delivered to a primary heat exchanger 14. Specifically, a subsonic stream of coolant vapor is delivered to the gas inlet of the nozzle/ejector unit 11 and a stream of liquid coolant is delivered to the liquid inlet of the nozzle/ejector unit 11. The stream of coolant vapor is expanded as it flows through a nozzle section of the nozzle/ejector unit 11 to generate a supersonic vapor stream due to conversion of heat energy into kinetic energy. The supersonic vapor stream entrains the subsonic liquid stream in an ejector section of the nozzle/ejector unit 11. As the vapor/liquid mixture reaches a discharge section of the nozzle/ejector unit 11, the pressure rises which acts to condense the vapor and significantly increase the temperature of the liquid coolant. This high temperature, high pressure stream of liquid coolant is delivered to the primary heat exchanger 14 where rejection of waste heat to a low temperature heat sink (i.e., ambient air) causes the liquid temperature to be reduced to the operating temperature of the heat source 12.

As a result of utilizing vapor compression, the heat rejection temperature of the liquid coolant delivered to the primary heat exchanger 14 is significantly increased, thereby permitting a commensurate reduction in size (i.e., surface area) of the primary heat exchanger 14 compared to the large heat exchangers associated with conventional liquid cooled systems. In addition, the increased liquid pressure discharged from the nozzle/ejector unit 11 circulates the coolant through the entire system 10. As such, the cooling system 10 requires little, if any, input energy to run and eliminates the large recirculation pump required in conventional cooling systems, thereby increasing the overall efficiency. While alternative embodiments of the cooling system 10 will be described hereinafter, each results in significant advantages over conventional systems. These advantages include, among others, reduced mass flow rates and heat exchanger sizes, elimination of the coolant recirculation pump and its system load requirements, improved packaging opportunities, and improved control of the heat source 12 operating temperature while concomitantly producing improved heat transfer capability.

Figure 2:
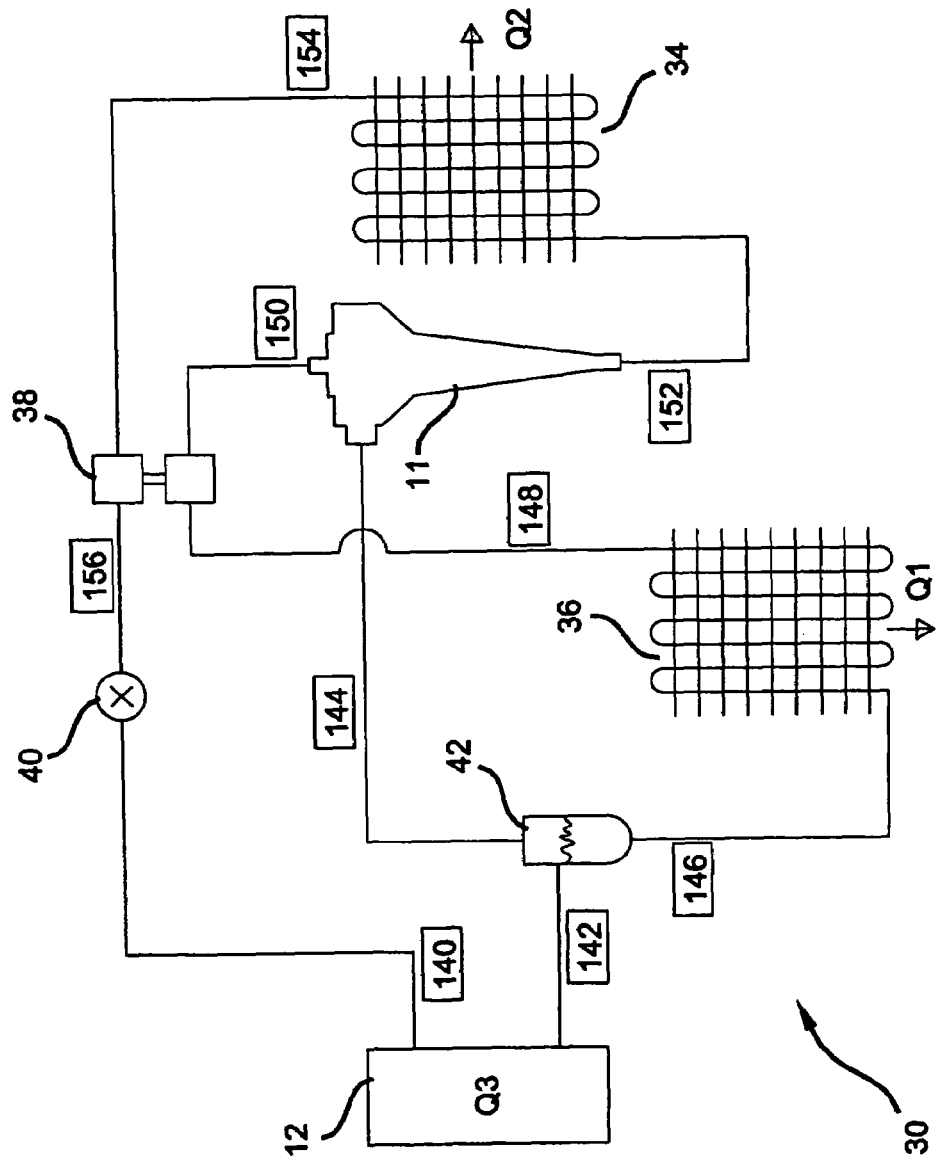
FIG. 2 is a schematic view of an alternative cooling system in accordance with the principles of the present invention.

With particular reference to FIG. 2, an alternative cooling system 30 is provided, functioning by the same principles as the cooling system 10 of FIG. 1. In particular, the cooling system 30 utilizes a coolant fluid that can be a mixture comprised of a predetermined mixture of ammonia ($NH_3$) and water ($H_2O$). The cooling system 30 includes the nozzle/ejector unit 11, a primary heat exchanger 34, a secondary heat exchanger 36, a hydraulic motor/pump 38, a pressure regulator valve 40, and a vapor separator 42. The various components of the cooling system 30 are configured in a circuit for providing fluid communication therebetween. In particular, cooling fluid circulating through the cooling system 30 is in heat exchange relationship with the heat source 12 for cooling the heat source 12. As described in further detail herein, the cooling fluid, having cooled the heat source 12, is heated to a partial vapor, liquid state. The vapor separator 42 separates the vapor fraction from the liquid fraction as the coolant exits the heat source 12. The liquid fraction flows through the secondary heat exchanger 36, reducing the temperature and pressure thereof and is then pumped by the hydraulic motor/pump 38 to an increased pressure and directed to the liquid inlet of the nozzle/ejector unit 11. The vapor fraction is directed to the vapor inlet of the nozzle/ejector unit 11.

The nozzle/ejector unit 11 utilizes the vapor fraction discharged from the heat source 12 to increase the temperature and pressure of liquid supplied to the primary heat exchanger 34, as described above. The higher temperature and pressure liquid from the nozzle/ejector unit 11 flows through the primary heat exchanger 34 where heat transfer to ambient occurs, thereby reducing the temperature and pressure of the liquid. In one preferred embodiment, the high pressure liquid is utilized to provide power for the hydraulic motor/pump 38, and the liquid is fed to the heat source 12 at a reduced pressure. Alternatively, however, the pressure regulator valve 40 acts to reduce the liquid discharged from the primary heat exchanger 34 to the heat source inlet pressure.

Figure 3:
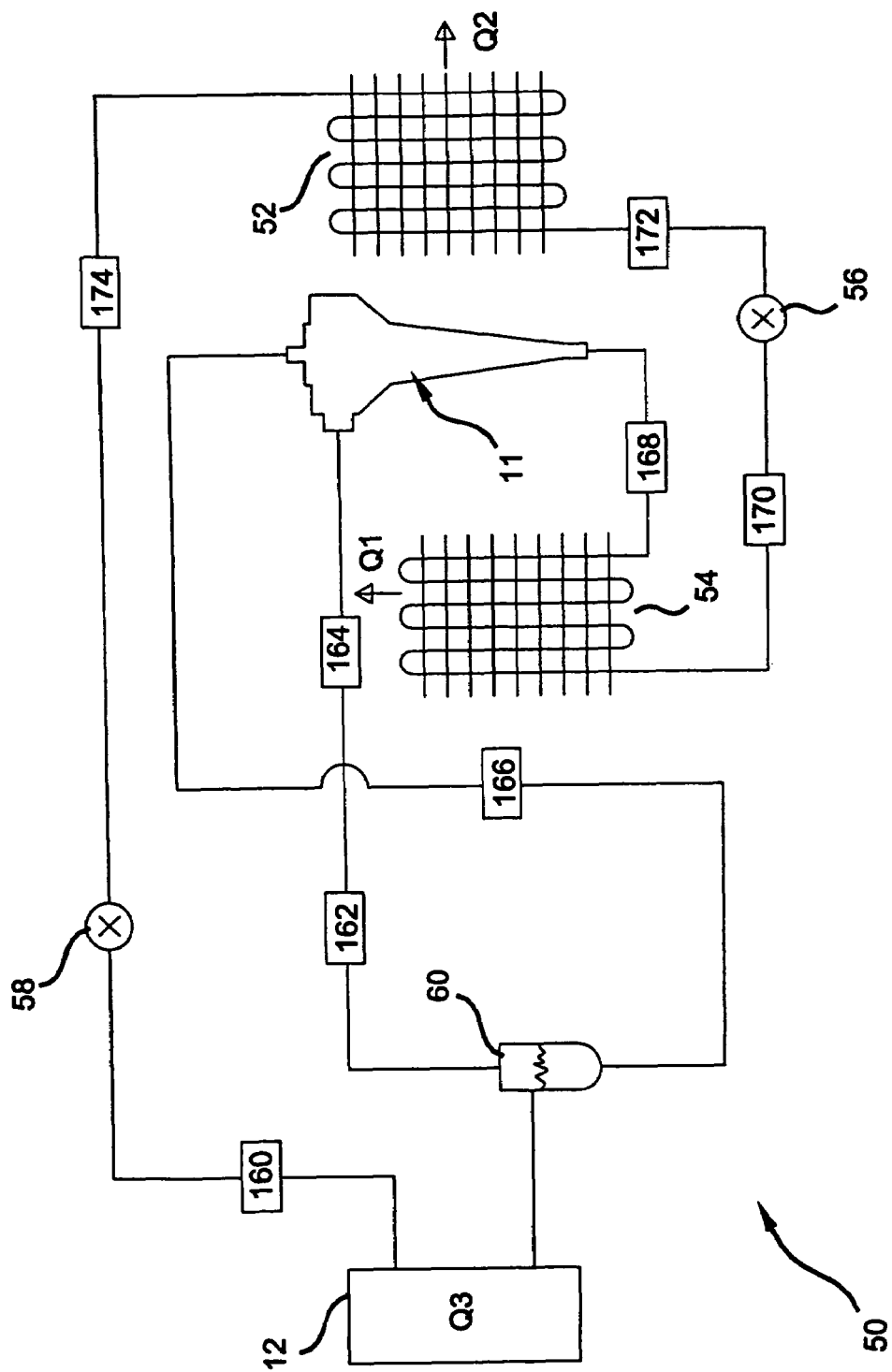
FIG. 3 is a schematic view of a second alternative cooling system in accordance with the principles of the present invention.

With reference to FIG. 3, a second alternative cooling system 50 is shown. The cooling system 50 includes the nozzle/ejector unit 11, a primary heat exchanger 52, a secondary heat exchanger 54, a first pressure regulator valve 56, a second pressure regulator valve 58 and a vapor separator 60. The various components of the cooling system 50 are configured in a circuit for providing fluid communication therebetween. In particular, coolant circulating through the cooling system 50 is in heat exchange relationship with the heat source 12 for cooling the heat source 12. As described in further detail herein, the coolant, having cooled the heat source 12, is heated to a partial vapor, liquid state. The vapor separator 60 separates the vapor fraction from the liquid fraction as the coolant exits the heat source 12. The liquid fraction flows to the liquid inlet of the nozzle/ejector unit 11 and the vapor fraction is directed to the vapor inlet of the nozzle/ejector unit 11.

The nozzle/ejector unit 11 utilizes the vapor fraction discharged from the heat source 12 to increase the temperature and pressure of liquid supplied initially to the secondary heat exchanger 54 and ultimately to the primary heat exchanger 52, as described above. The higher temperature and pressure liquid from the nozzle/ejector unit 11 flows through the secondary heat exchanger 54 where heat transfer to the vapor fraction fed to the vapor inlet of the nozzle/ejector unit 11 occurs. The liquid discharged from the secondary heat exchanger 54 flows at a reduced temperature and pressure to the first pressure regulator valve 56, whereby its pressure is reduced prior to entry into the primary heat exchanger 52. Heat transfer to ambient occurs as the coolant flows through the primary heat exchanger 52, thereby reducing the temperature and pressure of the liquid. The liquid then flows through the second pressure regulator valve 58 which reduces the pressure of the liquid to the heat source inlet pressure.

The cooling system 50 is a modified version of the cooling system 30 of FIG. 2 with the secondary heat exchanger 54 positioned such that heat extracted therefrom is used to increase the temperature of the vapor inlet stream sufficiently to establish the required temperature gradient between the vapor and liquid delivered to the inlet of nozzle/ejector unit 11.

Figure 4:
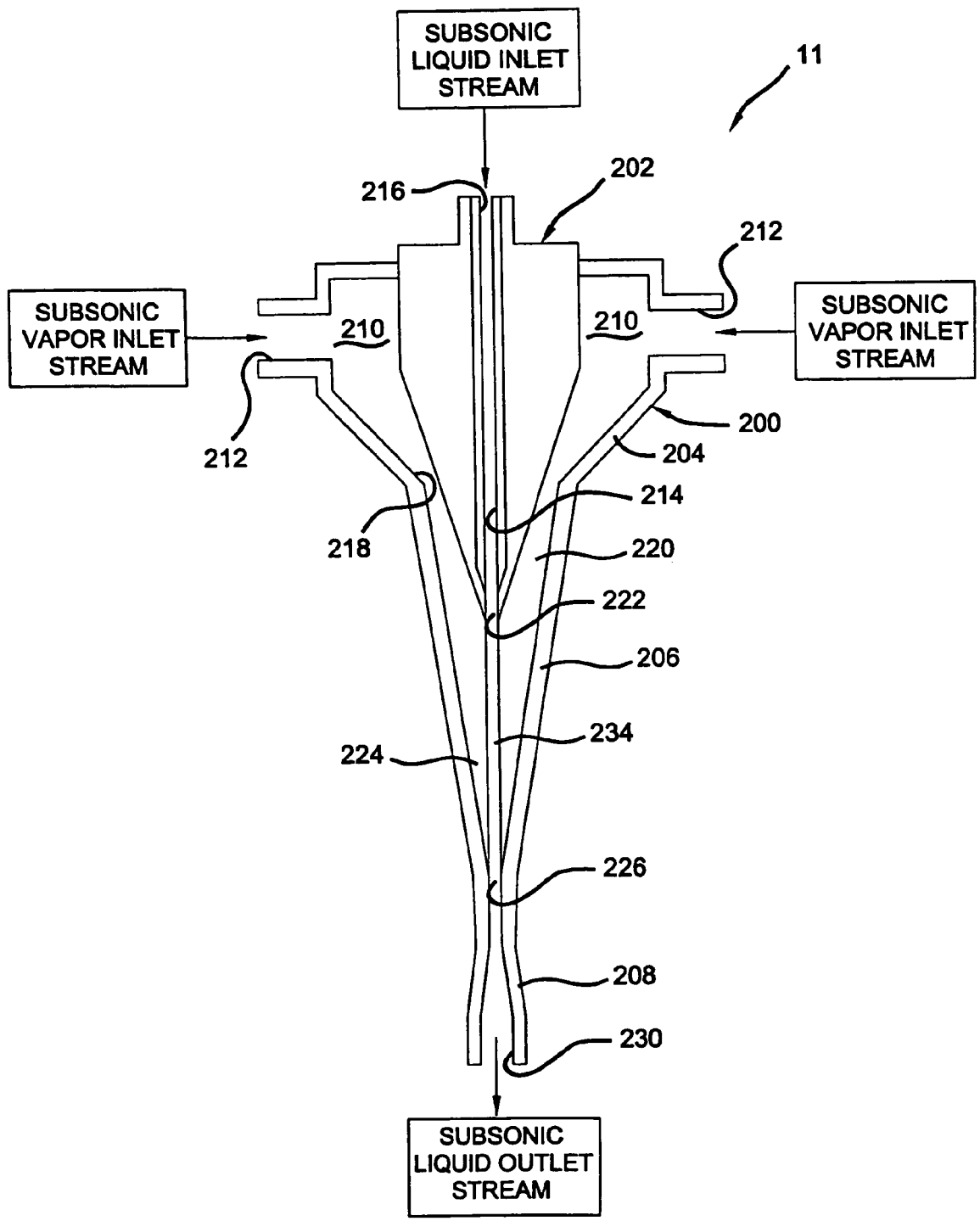
FIG. 4 is a sectional view of a supersonic nozzle/ejector unit associated with each of the cooling systems shown in FIGS. 1 through 3.

Referring now to FIG. 4, a first embodiment of nozzle/ejector, unit 11 is shown in section to include a valve body 200 and a nozzle block 202 mounted in valve body 200. Valve body 200 is a hollow cylindrical structure which defines a nozzle section 204, a converging ejector section 206, and a discharge section 208. An annular vapor inlet chamber 210 is defined between a portion of nozzle block 202 and a valve body 200. The subsonic vapor inlet stream flowing from the discharge side of the fuel cell stack is delivered to inlet chamber 210 through one or more vapor inlet ports 212. Likewise, the subsonic liquid inlet stream is delivered through a central liquid inlet port 216 to one end of a long liquid flow passage 214 formed in nozzle block 202.

Nozzle section 204 of valve body 200 defines an annular vapor nozzle 218 defined by a restricted throat area formed between a convergent/divergent inner wall surface of valve body 200 and a frusto-conical outer wall surface of nozzle block 202. An expansion chamber 220 is located downstream of vapor nozzle 218 and upstream of a liquid nozzle 222 formed at the terminal end of liquid flow passage 214. In addition, an acceleration chamber 224 is formed by ejector section 206 of valve body 200 downstream of expansion chamber 220. Ejector section 206 converges to define a discharge flow passage 226 at the downstream end of acceleration chamber 224. Finally, discharge section 208 of valve body 200 includes divergent wall surfaces defining a diffuser chamber 228 which terminates in an outlet port 230 through which the high temperature, high pressure liquid is discharged from nozzle/ejector unit 11.

In operation, the liquid inlet stream flowing through flow passage 214 and discharged through liquid nozzle 222 forms a free liquid jet 234 that extends through acceleration chamber 224 to discharge passage 226 where it subsequently enters diffuser chamber 228. Liquid jet 234 flows through acceleration chamber 224 without contacting the converging inner wall surfaces of ejector section 206. The area of liquid nozzle 222 defines the size and flow rate of liquid jet 234 based on the pressure gradient between the higher fluid pressure of the liquid inlet stream and the vapor pressure in acceleration chamber 224. The subsonic vapor inlet stream supplied to inlet chamber 210 is directed to vapor nozzle 218 which, in turn, directs the condensable vapor into expansion chamber 220. The vapor pressure of the subsonic vapor inlet stream forces the vapor stream at sonic velocity through vapor nozzle 218. Thereafter, the expanding vapor is further accelerated in expansion chamber 220 to supersonic velocity prior to entering acceleration chamber 224. The high velocity vapor surrounds and impinges upon liquid jet 234 so as to transfer the kinetic energy of the vapor to the liquid, thereby accelerating the liquid to a higher velocity and ultimately yielding a higher output pressure.

In acceleration chamber 224, the supersonic vapor impinges on and accelerates liquid jet 234 as it travels toward discharge passage 226. As a result of this transfer of kinetic energy to liquid jet 234, the vapor condenses as it travels the length of acceleration chamber 224. This results in a transfer of heat to the liquid for significantly increasing the temperature of liquid jet 234. As the vapor/liquid mixture enters discharge passage 226, the pressure rises further condensing the vapor and increasing the liquid temperature. The coolant discharged through discharge passage 226 to diffuser chamber 228 is substantially all liquid which is desired for transferring the liquid's kinetic energy into an amplified output pressure. Thus, kinematic vapor compression occurring within nozzle/ejector unit 86 involves converting vapor energy to a high velocity flow and transferring the kinetic energy to a slower moving liquid stream flowing unrestricted in a free jet so as to establish a high pressure, high temperature subsonic liquid outlet stream.

Figure 5:
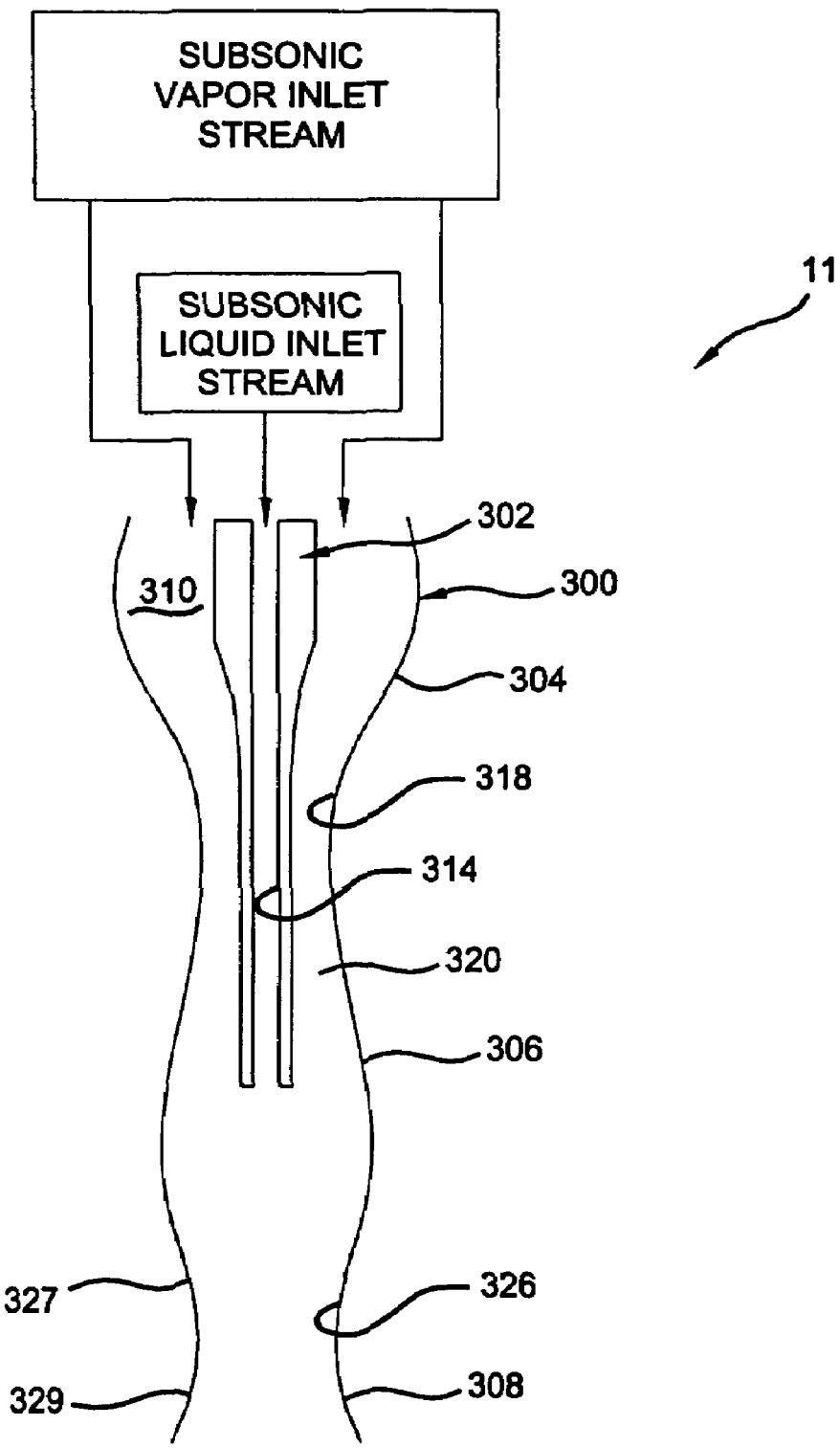
FIG. 5 is a sectional view of an alternative embodiment of the supersonic nozzle/ejector unit.

Referring now to FIG. 5, a second embodiment of supersonic nozzle/ejector unit 11 is shown to include a hollow cylindrical valve body 300 and a nozzle tube 302 disposed within valve body 300. Valve body 300 defines an inlet nozzle section 304, an ejector section 306, and a discharge section 308. An annular vapor inlet chamber 310 is defined between valve body 300 and nozzle tube 302 and is adapted to receive the subsonic vapor inlet stream. Likewise, the subsonic liquid inlet stream is delivered through an elongated flow passage 314 formed in nozzle tube 302. Nozzle section 304 of valve body 300 defines an annular vapor nozzle 318 that is formed between a convergent/divergent section of valve body 300 and nozzle tube 302. An expansion chamber 320 is located downstream of vapor nozzle 318 and upstream of a liquid nozzle 322 formed at the terminal end of liquid flow passage 314. In addition, an acceleration chamber 324 is formed between nozzle tube 302 and a bulbous portion 325 of ejector section 306. Discharge section 308 of valve body 300 includes a divergent portion 327 and a diffuser portion 329, both located downstream of liquid nozzle 322.

In a manner substantially similar to operation of the nozzle/ejector unit shown in FIG. 4, the nozzle/ejector unit shown in FIG. 5 creates a supersonic vapor stream in expansion chamber 320 as subsonic vapor is forced through vapor nozzle 318. The high velocity vapor impinges the liquid jet (not shown) discharged from liquid nozzle 322 so as to accelerate the liquid stream. The transfer of kinetic energy from the vapor to the liquid causes the vapor to condense so as to further transfer heat to the liquid for generating a significant temperature increase. A pressure increase occurs as the vapor/liquid mixture enters a restricted discharge passage 326 associated with discharge section 308.

Each of the cooling systems 10, 30, 50 described herein may be implemented in various applications. For example, the cooling systems 10, 30, 50 may be implemented to cool a heat source of a vehicle application, such as a fuel cell system. Alternatively, the cooling systems 10, 30, 50 can be implemented as air conditioning systems (i.e. heating and cooling) for a structure such as a building. It will be appreciated, however, that the cooling systems 10, 30, 50 of the present invention are not limited to implementation in the exemplary applications described herein. The particular function of each of the cooling systems 10, 30, 50 implemented in each of these exemplary applications will be discussed in detail.

Figure 6:
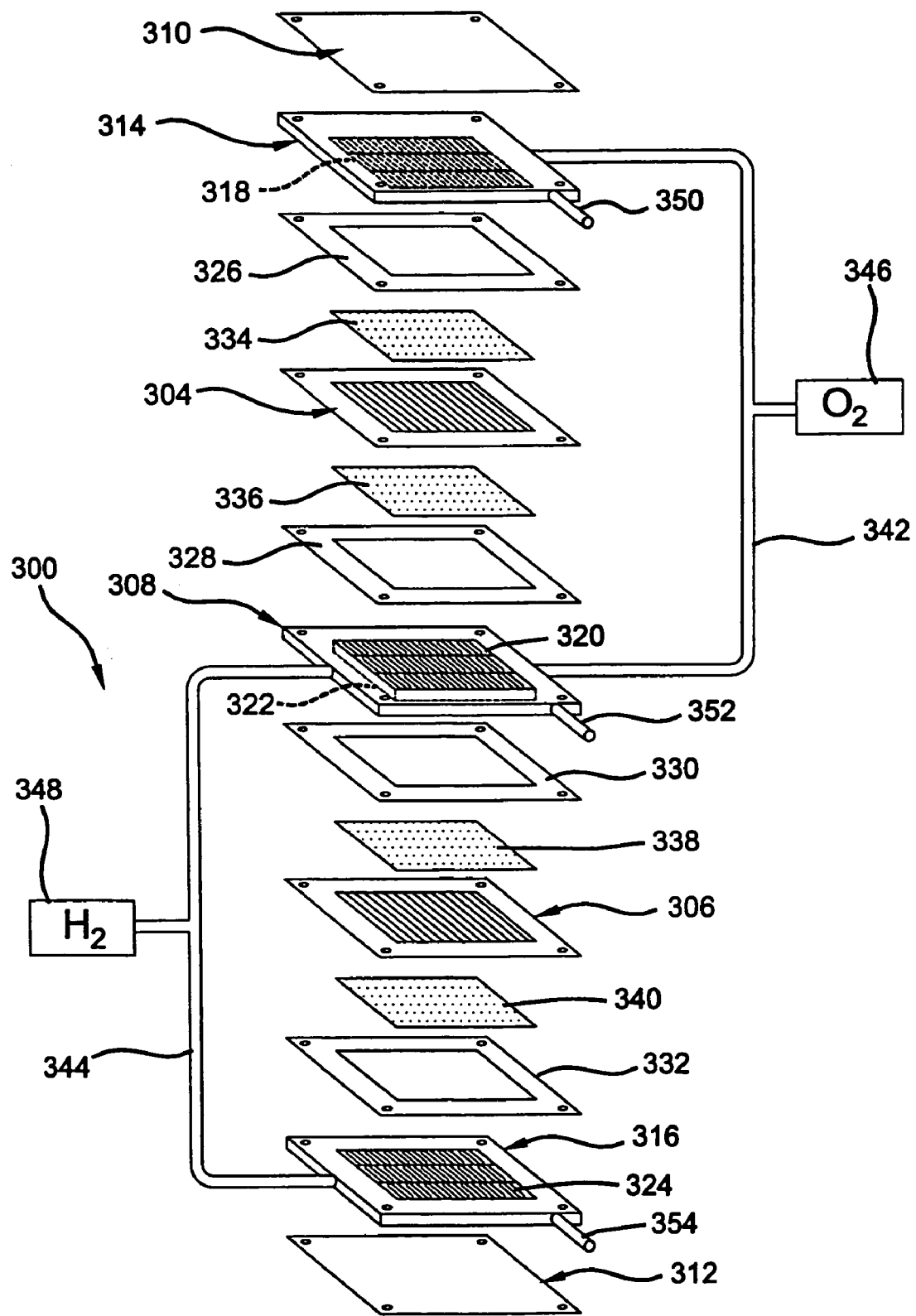
FIG. 6 is an exploded isometric view of a PEM fuel cell stack.

Before describing implementation of the cooling systems 10, 30, 50 in a fuel cell system, it is useful to understand an exemplary fuel cell system. Specifically, the fuel cell system shown in FIG. 6 is a two-cell, bipolar proton exchange membrane (PEM) type fuel cell stack 300 having a pair of membrane electrode assemblies (MEAs) 304 and 306 separated from each other by an electrically conductive, bipolar plate 308. MEAs 304, 306 and bipolar plate 308 are stacked together between stainless steel clamping plates 310, 312 and end contact elements 314, 316. End contact elements 314, 316, as well as bipolar plate 308, contain a plurality of grooves and openings 318, 320, 322, and 324 for distributing fuel and oxidant gases (i.e., $H_2$ and $O_2$) to MEAs 304 and 306. Nonconductive gaskets 326, 328, 330 and 332 provide seals and electrical insulation between the several components of the fuel stack 300. Connectors (not shown) are attached to clamping plates 10 and 12 to provide positive and negative terminals for the fuel cell stack 300.

With continued reference to FIG. 6, gas permeable carbon/graphite diffusion papers 334, 336, 338, and 340 are shown to be arranged to press against the electrode faces of MEAs 304 and 306. In addition, end contact elements 314 and 316 press against the carbon/graphite papers 334 and 340, respectively, while bipolar plate 308 presses against carbon/graphite paper 336 on the anode face of MEA 304 and against carbon/graphite paper 338 on the cathode face of MEA 306. Oxygen is supplied to the cathode side of the fuel cell stack from a storage tank 346 through the appropriate supply plumbing 342. In addition, hydrogen is supplied to the anode side of the fuel cell stack from a storage tank 348 via appropriate supply plumbing 344. Alternatively, air may be supplied to the cathode side from the ambient and hydrogen to the anode from a methanol reformer or the like. Exhaust plumbing for both the $H_2$ and $O_2$/air sides of the MEAs, while not shown, is also provided. Additional plumbing 350, 352 and 354 is provided for supplying coolant from an inlet header (not shown) of the fuel cell stack to bipolar plate 308 and end plates 314 and 316. Similar plumbing for exhausting coolant from bipolar plate 308 and end plates 314 and 316 to an exhaust header of the fuel cell stack is also provided, but not shown. As will be detailed, the cooling systems 10, 30, 50, constructed according to the various embodiments of the present invention, connect between the stack's inlet and exhaust headers and is operable to remove waste heat from the fuel cell stack 300 for rejection to the environment.

The fuel cell stack 300 shown is fueled by an $H_2$-rich reformate regardless of the method by which such reformate is made. It is to be understood that the principles embodied herein are applicable to fuel cells fueled by $H_2$ obtained from any source, including reformable hydrocarbon and hydrogen-containing fuels, such as methanol, ethanol, gasoline, alkene, or other aliphatic or aromatic hydrocarbons, or from fuel stored on board, such as $H_2$.

Figure 7:
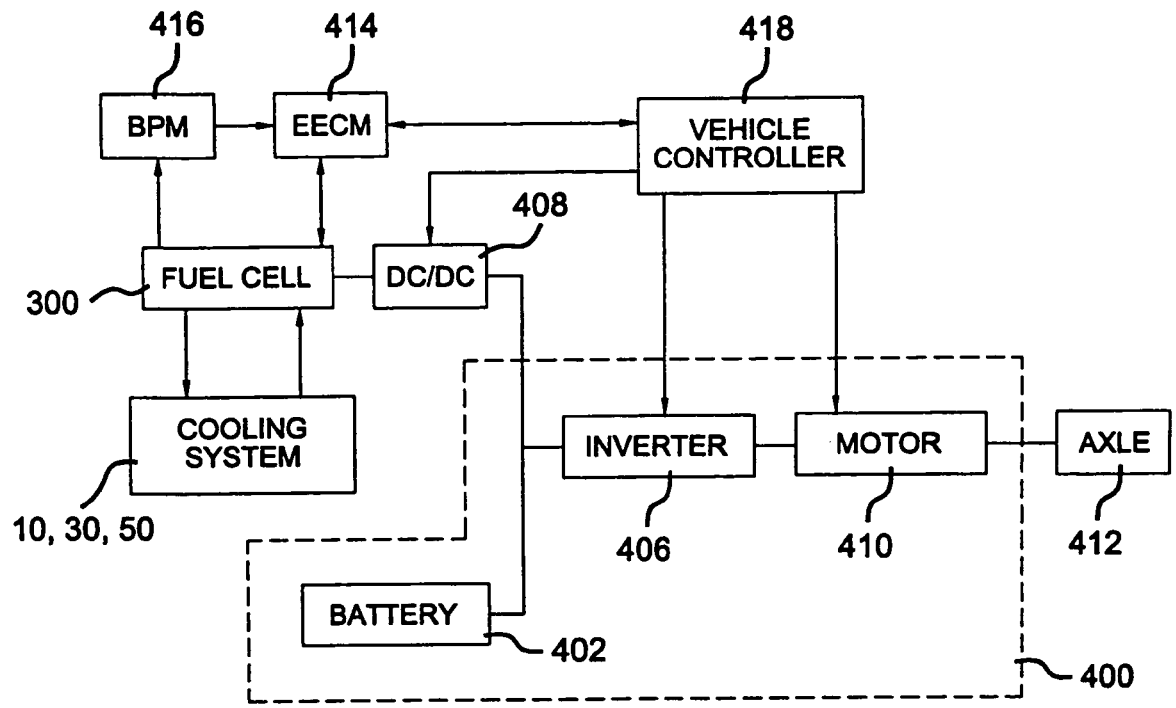
FIG. 7 is a diagram illustrating a particular use application for the fuel cell stack of FIG. 6.

FIG. 7 shows a preferred embodiment for the fuel cell system utilizing the fuel cell stack 300, constructed as shown in FIG. 6, in conjunction with a vehicle propulsion system 400. Propulsion system 400 is shown to include a battery 402, an electric motor 404, and its associated drive electronics including an inverter 406. Inverter 406 accepts electric energy from a DC/DC converter 408 associated with fuel cell system, and particularly from fuel cell stack 300, and to convert the electrical energy to mechanical energy produced by motor 410. Battery 402 is constructed and arranged to accept and store electrical energy supplied by fuel cell stack 300 and to accept and store electrical energy supplied by motor 410 during regenerative braking, and to provide electric energy to motor 410. Motor 410 is coupled to a driving axle 412 to supply motive rotary power to the wheels of a vehicle (not shown). An electrochemical engine control module (EECM) 414 and a battery pack module (BPM 416) monitor various operating parameters, including, but not limited to, the voltage and current of the fuel cell stack 300. For example, this is done by BPM 416, or by 416 and 414 together, to send an output signal (message) to a vehicle controller 418 based on conditions monitored by BPM 416. Vehicle controller 418 controls actuation of electric motor 410, the drive electronics including inverter 406, DC/DC converter 408, and requests a power level from EECM 414.

Controller 418 may comprise any suitable microprocessor, microcontroller, personal computer, etc., which has central processing unit capable of executing a control program and data stored in a memory. When activated, controller 418 carries out a series of operations stored in an instruction by instruction format in memory for providing engine control, diagnostic and maintenance operations. Controller 418 may be a dedicated controller specific to the present invention, or implemented in software stored in the main vehicle electronic control module. Further, although software based control programs are usable for controlling system components in various modes of operation as described above, it will also be understood that the control can also be implemented in part or whole by dedicated electronic circuitry.

Referring again to FIG. 1, the cooling system 10 is shown having a coolant, such as methanol, circulated through a closed-loop system for removing waste heat form the heat source (i.e., the fuel cell stack 300) and rejecting the waste heat primarily through the primary heat exchanger 14 to the environment. With reference to Table A provided below, various characteristics of the methanol coolant at various flow positions within the cooling system 10 will be disclosed in accordance with an exemplary stack operating configuration (i.e., a 80 kW PEM stack operating at 80° C.). Each flow position is identified by a position block having a corresponding reference numeral assigned thereto.

TABLE A

| POSITION BLOCK | TEMP (° C.) | PRESSURE (kPa) | FLOW RATE (gm/sec) |
|---|---|---|---|
| 110 | 80 | 190 | 93.5 |
| 112 | 80 | 181 | 93.5 |
| 114 | 80 | 181 | 74.8 |
| 116 | 80 | 181 | 18.7 |
| 118 | 57 | 1158 | 523.8 |
| 120 | 105 | 1283 | 598.6 |
| 122 | 80 | 1219 | 598.6 |
| 124 | 80 | 1219 | 523.8 |
| 126 | 80 | 1219 | 598.6 |
| 128 | 80 | 190 | 74.8 |
| 130 | 80 | 190 | 18.7 |

FIG. 1

At position block 110, a stream of liquid methanol is delivered to the inlet header of the stack 300. As the liquid methanol flows through the cooling passages within the stack 300, it partially vaporizes and exits the exhaust header of the stack 300 with the characteristics listed for position block 112. To cause such vaporization, the outlet pressure of the liquid/vapor mixture exiting the stack 300 is selected and maintained such that the vaporization temperature of the coolant is equal to the stack's operating temperature. For methanol, an outlet pressure of about 181 kPa equates to a stack operating temperature of 80° C. Moreover, the vaporization mass flow rate for methanol is about 74.8 gm/sec. Assuming a 25% excess flow is required to assure adequate cooling across the entire stack during maximum power conditions, a total circulation through the heat source 12 of about 93.5 gm/sec is utilized in the cooling system 10.

Position block 114 represents the characteristics of the vapor fraction and position block 116 represents the characteristics of the liquid fraction downstream of the vapor separator 24. As described in greater detail above, vapor compression within the nozzle/ejector unit 11 causes the liquid stream discharged from the discharge section of the nozzle/ejector unit 11 to be significantly higher in temperature and pressure than either of the inlet vapor and liquid streams alone or combined. To this end, position block 120 identifies the characteristics of the subsonic condensed liquid coolant discharged from the nozzle/ejector unit 11.

Assuming a maximum ambient temperature of 40° C. flowing across the heat transfer surface areas of the primary heat exchanger 14, the 105° C. heat rejection temperature of the liquid methanol coolant flowing through the primary heat exchanger 14 produces a 65° C. temperature difference that is used for efficiently transferring waste heat to the environment. Compared to a 40° C. temperature difference associated with a conventional liquid cooling system (80° C. liquid subtracted from 40° C. ambient air), the 65° C. temperature difference produced by vapor compression within the nozzle/ejector 11 unit permits a proportional reduction in the heat transfer surface areas required from the primary heat exchanger 14. That is, a reduction corresponding to the 25° C.

temperature difference. The high pressure liquid stream exiting the primary heat exchanger 14 is at 80° C. which is the operating temperature of the stack 300. The small pressure drop across the primary heat exchanger 14 is attributable to line losses. Position block 122 identifies the liquid characteristics downstream of the primary heat exchanger 14.

The liquid is then split within the splitter valve 18, resulting in approximately 87.5% of the liquid flow to be fed to the secondary heat exchanger 16 and the remaining 12.5% to be fed back toward the stack 300. Characteristics of the liquid portion flowing to the secondary heat exchanger 16 are identified by position block 124 and characteristics of the liquid portion flowing back to the stack 300 are identified by position block 126. Flowing through the secondary heat exchanger 16, the liquid portion experiences a heat transfer and thus, a temperature drop of approximately 23° C., to 57° C. as shown by position block 118. In this manner, the temperature of the liquid portion is appropriate for optimal operation of the nozzle/ejector unit 11. Specifically, optimal operation of the nozzle/ejector unit 11 requires that the temperature of the subsonic liquid stream be less than the temperature of the subsonic vapor stream.

The pressure regulator valve 20 reduces the pressure of the second liquid stream to the coolant inlet pressure of 190 kPa. Position block 128 sets forth the liquid characteristics downstream of the pressure regulator valve 20. After experiencing a pressure reduction through the pressure regulator valve 20, the second liquid stream flows to the mixer 22 for mixing with the liquid stream flowing from the vapor separator 24. The liquid stream from the vapor separator 24 is initially at a temperature of 80° C. and a pressure of 181 kPa, as identified by position block 116. The liquid stream is pumped back to the mixer 22 by the pump 26, thereby experiencing a pressure increase to 190 kPa, as indicated by position block 130. The liquid streams are mixed within the mixer 22 and flow to the inlet header of the stack for cooling thereof.

The cooling system 10 detailed in reference to FIG. 1, disclosed to use methanol as the coolant. However, it is contemplated that any two phase working fluid having a vaporization temperature and pressure within the range of the operating characteristics of the fuel cell system can be used in substitution for methanol. Moreover, the present invention also contemplates use of two component coolants for use with the vaporization and supersonic vapor compression features to cool the stack. Specifically, the cooling system 30 of FIG. 2 utilizes a coolant mixture comprised of a predetermined mixture of ammonia ($NH_3$) and water ($H_2O$). Table B sets forth the characteristics of the two component coolant at specific positions in the closed-loop recirculatory cooling system.

TABLE B

FIG. 2

| Position Block | Liquid Mass Fraction | | Vapor Mass Fraction | | Temp (° C.) | Pressure (kPa) |
|---|---|---|---|---|---|---|
| | $NH_3$ | $H_2O$ | $NH_3$ | $H_2O$ | | |
| 140 | 71% | 29% | | | 77 | 2536 |
| 142 | 65% | 35% | 99.4% | 0.6% | 80 | 2479 |
| 144 | | | 99.4% | 0.6% | 80 | 5500 |
| 146 | 65% | 35% | | | 80 | 2479 |
| 148 | 65% | 35% | | | 61 | 2355 |
| 150 | 65% | 35% | | | 61 | 5000 |
| 152 | 71% | 29% | | | 107 | 5500 |

TABLE B-continued

FIG. 2

| Position Block | Liquid Mass Fraction | | Vapor Mass Fraction | | Temp (° C.) | Pressure (kPa) |
|---|---|---|---|---|---|---|
| | $NH_3$ | $H_2O$ | $NH_3$ | $H_2O$ | | |
| 154 | 71% | 29% | | | 77 | 5225 |
| 156 | 71% | 29% | | | 77 | 5225 |

Referring still to FIG. 2, the coolant enters the stack 300 at its inlet header with a $NH_3/H_2O$ ratio of 71/29 on a percentage mass basis at the temperature, pressure and flow rate set forth in Table B for position block 140. Vaporization of the mixed coolant as it flows through the stack 300 results in differing ratios for the vapor fraction and the liquid fraction, at position block 142 as separated by the vapor separator 42, as denoted by position blocks 144 and 146, respectively. The vapor fraction is delivered to the vapor inlet of the nozzle/ejector unit 11 at 80° C. The liquid fraction is transferred through a the secondary heat exchanger 36 for cooling prior to delivery to the liquid inlet of nozzle/ejector unit 11. Position block 148 indicates a temperature reduction from 80° C. to 61° C. generated by extracting heat from the secondary heat exchanger 36. A minimal pressure drop of about 124 kPa across the secondary heat exchanger 36 is due to line losses. The liquid fraction is then pumped through the hydraulic motor/pump 38, thereby experiencing a significant increase in pressure, as indicated at position block 150, prior to flow into the nozzle/ejector unit 11.

As a result of vapor compression within the nozzle/ejector unit 11, the resulting liquid outlet stream has a significantly increased temperature and pressure, as indicated by the characteristic values noted in Table B for position block 152. It should also be noted that the vapor compression results in re-establishment of the original mixture ratio. The outlet liquid stream flows into the primary heat exchanger 34, whereby the temperature of the liquid coolant flowing through the primary heat exchanger 34 is reduced from 107° C. to 77° C. (the desired operating temperature of the stack) as shown by position block 154. The primary heat exchanger 34 is again used to reject a substantial portion of the waste heat to the environment. The liquid coolant flowing from the primary heat exchanger 34 either flows through the hydraulic motor/pump 38 or the pressure regulator valve 40, depending upon the system configuration, experiencing a pressure decrease of approximately 2688 kPa therethrough and flows back into the stack 300 for cooling thereof.

The second alternative cooling system 50 of FIG. 3 also utilizes a coolant mixture comprised of a predetermined mixture of ammonia ($NH_3$) and water ($H_2O$). Table C sets forth the characteristics of the two component coolant at specific positions in the closed-loop recirculatory cooling system 50.

TABLE C

FIG. 3

| POSITION BLOCK | % $NH_3$ % $H_2O$ | TEMP (° C.) | PRESSURE (kPa) | FLOW RATE (gm/sec) |
|---|---|---|---|---|
| 160 | 59/41 | 67 | 280 | 68 |
| 162 | 78/22 | 80 | 275 | 48 |
| 164 | 78/22 | 90 | 275 | 48 |
| 166 | 15/85 | 80 | 270 | 20 |
| 168 | 59/41 | 162 | 8273 | 68 |
| 170 | 59/41 | 150 | 8273 | 68 |

TABLE C-continued

FIG. 3

| POSITION BLOCK | % NH$_3$ % H$_2$O | TEMP (° C.) | PRESSURE (kPa) | FLOW RATE (gm/sec) |
|---|---|---|---|---|
| 172 | 59/41 | 150 | 1000 | 68 |
| 174 | 59/41 | 67 | 1000 | 68 |

The circulation of the coolant through the cooling system 50 is similar to that described above for the cooling systems 10, 30. Therefore, a detailed description of the coolant circulation of the cooling system is foregone. The cooling system 50 of FIG. 3 is configured, whereby heat extracted from the secondary heat exchanger 54 is used to heat the vapor fraction supplied to the vapor inlet of the nozzle/ejector unit 11. In this manner, the required temperature gradient between the vapor and liquid delivered to the respective inlets of the nozzle/ejector unit 11 is maintained.

In one aspect, the cooling systems 10, 30, 50 described herein, are functional to cause a heat transfer from an intermediate temperature to a higher temperature in combination with a lower temperature heat sink. Traditional cooling systems require a significant amount of work and additional components to achieve a similar result. Tables A, B and C detail operation of the cooling systems 10, 30, 50, respectively, for a fuel cell stack cooling application, whereby the heat source 12 is the high temperature source (approximately 80° C.), the primary heat exchanger 14, 34, 52 is in heat exchange relationship with the intermediate temperature source (approximately 40° C.) and the secondary heat exchanger 16, 36, 54 is in heat exchange relationship with the low temperature source (approximately 25° C.).

Figure 8:
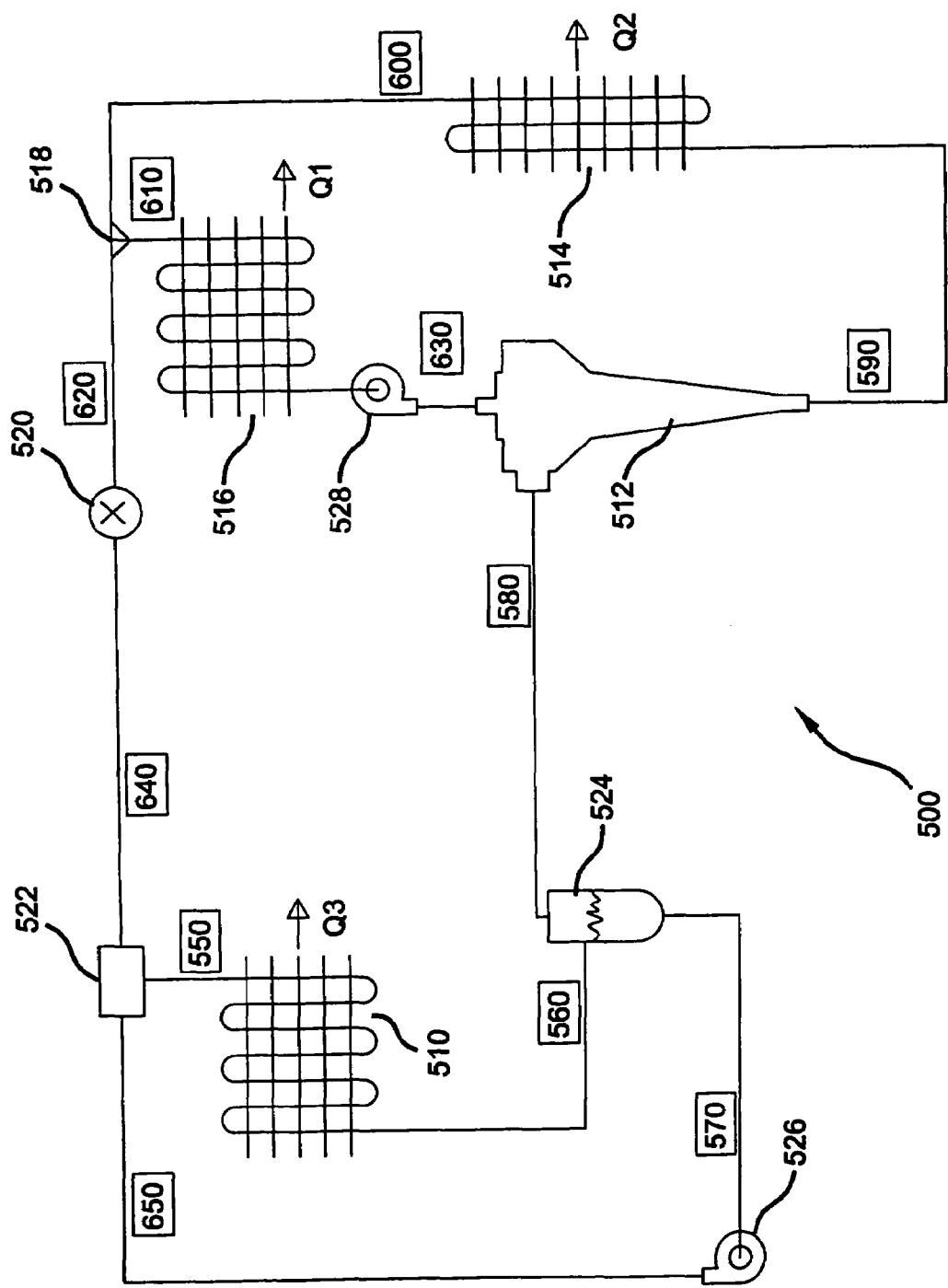
FIG. 8 is a schematic view of a third alternative cooling system in accordance with the principles of the present invention.
Figure 9:
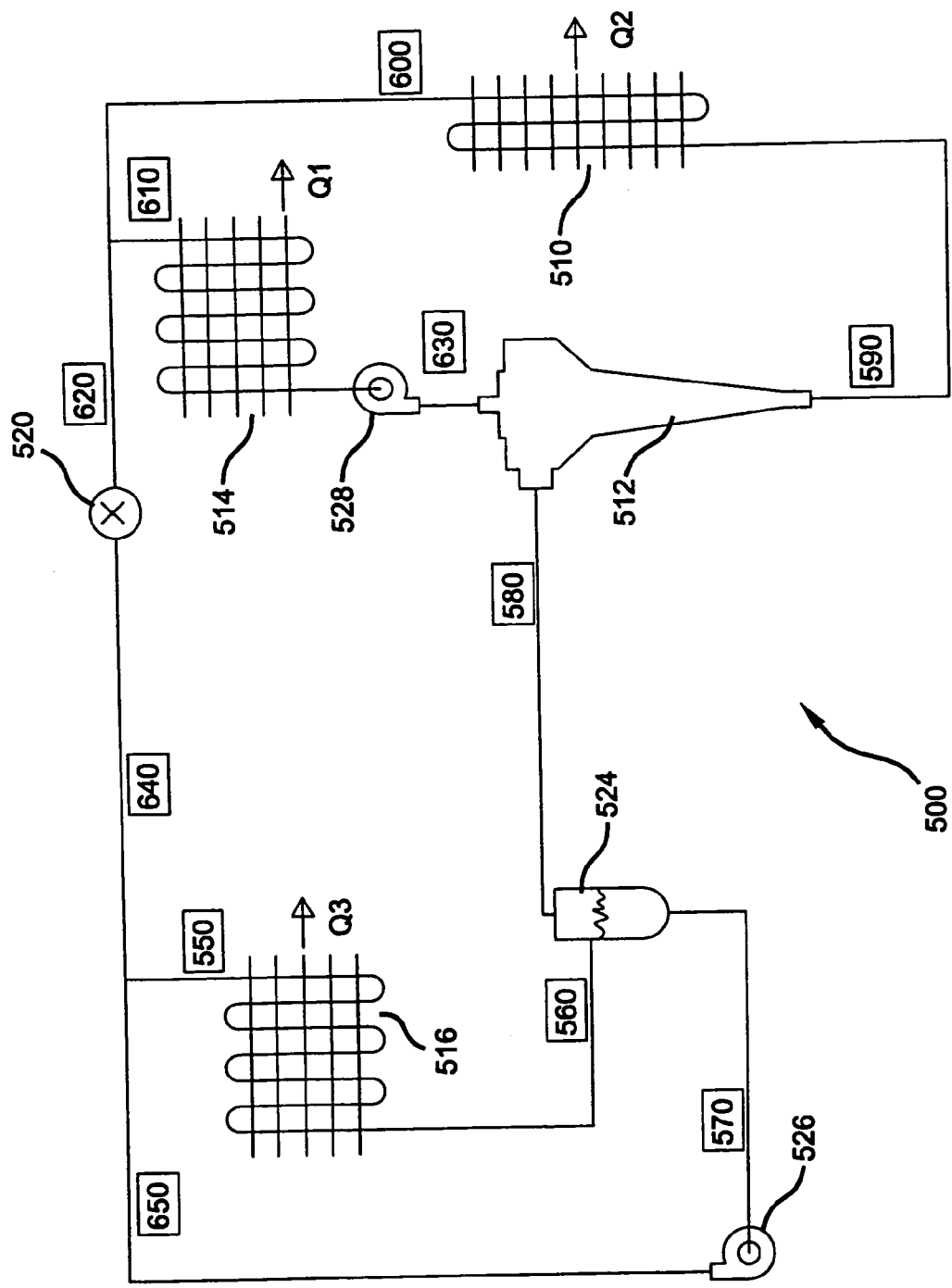
FIG. 9 is a schematic view of the third alternative cooling system configured for heating.

As discussed above, the cooling systems 10, 30, 50 are applicable in other applications, such as air conditioning (heating and cooling) of a structure (e.g. building, house and the like). In such an application, parallel cooling systems would be required, the first to perform the cooling function and the second to perform the heating function, with the object to be temperature control of the structure. It will be appreciated, however, that although parallel systems are required, a significant advantage is maintained in that the cooling systems have minimal energy requirements to function. Thus, in a power outage situation, the cooling systems can continue effectively operating using battery power or the like. With reference to FIGS. 8 and 9, a cooling system 500 is provided respectively configured for cooling and heating a structure 510.

With particular reference to FIG. 8, the cooling system 500 includes a supersonic nozzle/ejector unit 512, a primary heat exchanger 514, a secondary heat exchanger 516, a splitter valve 518, a pressure regulator valve 520, a mixer 522, a vapor separator 524 a first pump 526 and a second pump 528. The various components of the cooling system 500 are configured in a circuit for providing fluid communication therebetween. In particular, cooling fluid circulating through the cooling system 500 is in heat exchange relationship with the structure 510 for cooling the structure 510. As described in further detail herein, the cooling fluid, having cooled the structure 510, is heated to a partial vapor, liquid state. The vapor separator 524 separates the vapor fraction from the liquid fraction as the coolant exits the structure 510. The liquid fraction is pumped by the first pump 526 back around to the mixer 522 for further cooling of the structure 510. The vapor fraction is directed to the nozzle/ejector unit 512.

The nozzle/ejector unit 512 utilizes the vapor fraction discharged from the structure 510 to increase the temperature and pressure of coolant fluid supplied to the primary heat exchanger 514, as described in further detail herein. The higher temperature and pressure coolant fluid discharged from the nozzle/ejector unit 512 flows through the primary heat exchanger 514 where heat transfer to ambient occurs, thereby reducing the temperature and pressure of the coolant fluid. The splitter valve 518 splits the stream exiting the primary heat exchanger 514 into a first liquid stream supplied to the secondary heat exchanger 516 and a second liquid stream routed toward the heat source 512. The splitter valve 518 also reduces the pressure of the second liquid stream. The secondary heat exchanger 516 functions to reduce the temperature of the liquid coolant delivered to the liquid inlet of the nozzle/ejector unit 512 to a value below the vaporization temperature of the coolant and the second pump 528 pumps the second liquid stream at an increased pressure to the nozzle/ejector unit 512.

The pressure regulator valve 520 functions to reduce the high pressure liquid coolant discharged from the mixer 522 to the heat source inlet pressure for mixing with the liquid fraction in the mixer 522. The mixer 522 combines the liquid coolant flowing from the primary heat exchanger 514 with the liquid coolant from the vapor separator 524. The small low-power return pump 526 delivers the coolant recycled from vapor separator 524 to the mixer 522. The outlet of the mixer 522 is delivered to the structure 510. The first pump 526 can also be used during start-up of the cooling system 500.

For cooling, the cooling system 500 would function similarly as described herein but at lower temperature values. With reference to Table D, below, characteristics for the various stages are provided, having associated position blocks.

TABLE D

FIG. 8

| POSITION BLOCK | TEMP (° C.) | PRESSURE (kPa) | MASS FLUX (g/sec) |
|---|---|---|---|
| 550 | 20 | 13.7 | 28.3 |
| 560 | 20 | 13.0 | 28.3 |
| 570 | 20 | 13.0 | 7.1 |
| 580 | 20 | 13.0 | 21.2 |
| 590 | 41 | 1092.0 | 403.7 |
| 600 | 30 | 1037.4 | 403.7 |
| 610 | 30 | 1037.4 | 382.5 |
| 620 | 30 | 1037.4 | 21.2 |
| 630 | 15 | 985.5 | 382.5 |
| 640 | 20 | 13.7 | 21.2 |
| 650 | 20 | 13.7 | 7.1 |

The structure 510 would preferably be controlled to a desired temperature of approximately 20° C. with an outside ambient temperature within an approximate range of 30° C. to 42° C. (this may vary depending upon geographic location and season). The low temperature source heat sink could be provided as the ground water source located within the earth below the structure, generally at a temperature of approximately 7 to 10° C. Thus, for the structure 510 cooling example, the intermediate temperature source would be provided as the structure 510, the low temperature source as the ground water, and the high temperature heat sink would be ambient air.

To perform the heating function, the cooling system 500 would function similarly as that described for the cooling systems 10, 30, 50, again at lower temperature values. With reference to Table E, below, characteristics for the various stages are provided, having the position blocks described above for cooling.

TABLE E

FIG. 9

| POSITION BLOCK | TEMP (° C.) | PRESSURE (kPa) | MASS FLUX (g/sec) |
|---|---|---|---|
| 550 | 30 | 10.4 | 112.6 |
| 560 | 30 | 9.9 | 112.6 |
| 570 | 30 | 9.9 | 28.2 |
| 580 | 30 | 9.9 | 84.5 |
| 590 | 41 | 1118.4 | 929.1 |
| 600 | 30 | 1062.5 | 929.1 |
| 610 | 30 | 1062.5 | 844.6 |
| 620 | 30 | 1062.5 | 84.5 |
| 630 | −5 | 1009.3 | 844.6 |
| 640 | 30 | 10.4 | 84.5 |
| 650 | 30 | 10.4 | 28.2 |

For example, the structure would be controlled to a desired temperature of approximately 25° C. with an outside ambient temperature within an approximate range of −10° C. (this may vary depending upon geographic location and season). The intermediate temperature source would be provided as the ground water source located within the earth below the structure, generally at a temperature of approximately 7 to 10° C. Thus, for the structure heating case, the high temperature source would be provided as the inside ambient of the structure, the intermediate temperature source as the ground water and the low temperature source as the outside ambient.

From the foregoing description it should be clear that the supersonic vapor compression and heat cycle disclosed for use in efficiently cooling a heat source, such as a fuel cell system, is a significant advancement which will provide improvements in terms of system operating efficiency and complexity. Since the system uses waste heat to drive the flow and the temperature increase, pumping power requirements are eliminated, or significantly reduced, thereby increasing the useful operating efficiency of the fuel cell system. Moreover, the system of the present invention replaces a significant portion of the heat exchanger area with a relatively small nozzle/ejector unit. This permits smaller coolant mass flow rates which, in turn, permits use of smaller plumbing lines. Vaporization of the coolant at the fuel cell stack operating temperature allows the entire stack to be maintained at its optimum temperature, thereby increasing stack performance. The supersonic vapor compression and heat cycle of the present invention can be used as a cooling system for extracting waste heat from high temperature heat sources other than fuel cell stacks. Possible applications include cooling of vehicle cabins, building interiors, and internal combustion engines. It is to be understood that the coolant characteristic values set forth in the tables are provided for exemplary purposes only and that the values will vary based on the specific operating characteristics of the heat transfer system to which the present invention is applied.

While the invention has been disclosed primarily in terms of specific embodiments, it is not intended to be limited thereto but rather only to the extent set forth in the following claims.

What is claimed is:

1. A system for heat transfer comprising:
   a heat source having a coolant circulating through a coolant path;
   a first heat exchanger;
   a first fluid pathway providing fluid communication between an outlet of said heat source coolant path and an inlet to said first heat exchanger;
   a second fluid pathway providing fluid communication between an outlet of said first heat exchanger and an inlet of said heat source coolant path;
   said coolant flowing through said first and second fluid pathways such that a portion of said coolant flowing through said heat source coolant path vaporizes as a result of heat transferred from said heat source;
   means for separating a vapor stream from said coolant discharged from said heat source coolant path; and
   vapor compression means for accelerating said vapor stream to supersonic velocity and directing a liquid stream from said second fluid pathway into contact with said supersonic vapor stream for causing compression of said vapor, resulting in a high temperature, high pressure liquid coolant that flows directly into said inlet of said heat exchanger and through said first heat exchanger for rejecting heat to a heat sink and circulating said coolant through said system.

2. The heat transfer system of claim 1, further comprising a means for splitting said liquid stream from said liquid coolant in said second fluid pathway.

3. The heat transfer system of claim 1 further comprising an intermediate heat exchanger having an inlet receiving said liquid stream from said separator means and an outlet in fluid communication with said liquid inlet of said nozzle/ejector unit.

4. The heat transfer system of claim 1 further comprising an upstream heat exchanger having an inlet in fluid communication with said outlet of said nozzle/ejector unit and an outlet in fluid communication with said inlet of said first heat exchanger.

5. The heat transfer system of claim 4 wherein heat rejected from said upstream heat exchanger is used to heat said vapor stream prior to delivery of said vapor stream to said vapor inlet of said nozzle/ejector unit.

6. The heat transfer system of claim 4 further comprising a pressure regulator valve disposed in said first fluid pathway between said outlet of said upstream heat exchanger and said inlet of said first heat exchanger.

7. The heat transfer system of claim 1 further comprising a pressure regulator valve disposed in said second fluid pathway between first heat exchanger and said heat source.

8. The heat transfer system of claim 1 further comprising an additional heat exchanger having an inlet in fluid communication with an outlet of said separator means and an outlet in fluid communication with said liquid inlet of said nozzle/ejector unit.

9. The heat transfer system of claim 1 further comprising a pump disposed in said second fluid pathway between said first heat exchanger and said fuel cell.

10. The heat transfer system of claim 1 wherein said vapor compression means is a nozzle/ejector unit that comprises:
    a valve body defining a vapor chamber in fluid communication with said vapor inlet, an expansion chamber, and an acceleration chamber; and
    a nozzle member extending into said valve body and including a central flow passage having a first end in fluid communication with said liquid inlet and a second end defining said liquid nozzle, said liquid nozzle is oriented to discharge a liquid jet into said acceleration chamber of said valve body;

said vapor nozzle is defined by a restricted area formed between said valve body and said nozzle member, said vapor nozzle is located between said vapor chamber and said expansion chamber such that said vapor stream is drawn through said vapor nozzle from said vapor chamber and accelerated to supersonic velocity due to expansion of said vapor in said expansion chamber.

11. The heat transfer system of claim 10 wherein said supersonic vapor stream surrounds and impinges on said liquid jet and acts to accelerate said liquid jet to a subsonic velocity.

12. The heat transfer system of claim 1 wherein said heat source is a fuel cell.

\* \* \* \* \*